United States Patent [19]

Applequist

[11] 4,211,288
[45] Jul. 8, 1980

[54] RAISABLE IMPLEMENT FRAME WITH OPERABLY CONNECTED WHEEL AND DRAFT FRAMES

[75] Inventor: Roy E. Applequist, Salina, Kans.

[73] Assignee: Great Plains Manufacturing Incorporated, Salina, Kans.

[21] Appl. No.: 950,247

[22] Filed: Oct. 10, 1978

Related U.S. Application Data

[62] Division of Ser. No. 836,719, Sep. 26, 1977, Pat. No. 4,171,022.

[51] Int. Cl.$^3$ .............................................. A01B 63/22
[52] U.S. Cl. ...................................... 172/328; 172/240
[58] Field of Search ............... 172/240, 244, 311, 327, 172/328, 396, 397, 398, 413, 466, 680; 403/113, 117; 280/43.23

[56] References Cited

U.S. PATENT DOCUMENTS

| | | | |
|---|---|---|---|
| 2,458,091 | 1/1949 | Moore | 172/396 |
| 2,580,100 | 12/1951 | Johansen et al. | 172/396 X |
| 3,637,028 | 1/1972 | Fueslein et al. | 172/328 X |
| 3,912,017 | 10/1975 | Rehn | 172/328 |
| 4,150,724 | 4/1979 | Strobel | 172/328 |

*Primary Examiner*—Richard T. Stouffer
*Attorney, Agent, or Firm*—Schmidt, Johnson, Hovey & Williams

[57] ABSTRACT

A foldable implement construction includes an implement tool carrying center frame pivotally connected to a draft frame and is provided with a pair of transversely extending outrigger tool sections connected on respective opposite sides of the center frame by a single ball and socket-like hinge which provides a single hinge for both horizontal swinging of the outrigger sections from their transversely extending working position to a longitudinally extending transport position, and further provides for radial pivotal movement of the outrigger sections in their working position to allow the latter to cant and rise and fall in accordance with uneven terrain. Superstructure provided on the center frame cooperates with the ball and socket hinge to both limit of the degree of radial pivotal freedom of the outrigger sections in the working position and to cantilever mount the outrigger sections on the center frame in the transport position, whereby to eliminate the need for wheels for supporting the outer extremities of the outrigger sections when the latter are swung between their working and transport positions. The center frame is also provided with a tranversely extending tool section and includes wheels and associated mechanism mounted thereto for vertical shifting into and out of engagement with the ground to permit raising each of the tool sections out of contact with the ground in order to allow folding of the outrigger sections for transport. Each of the tool sections is provided with a vertically shiftable, removably mounted tool carrying frame to permit simple interchange of tools, and includes mechanism for manually varying the penetration depth of the implement tools, without resort to vertically shiftable, ground engaging wheels for altering the elevation of the entire tool section.

3 Claims, 11 Drawing Figures

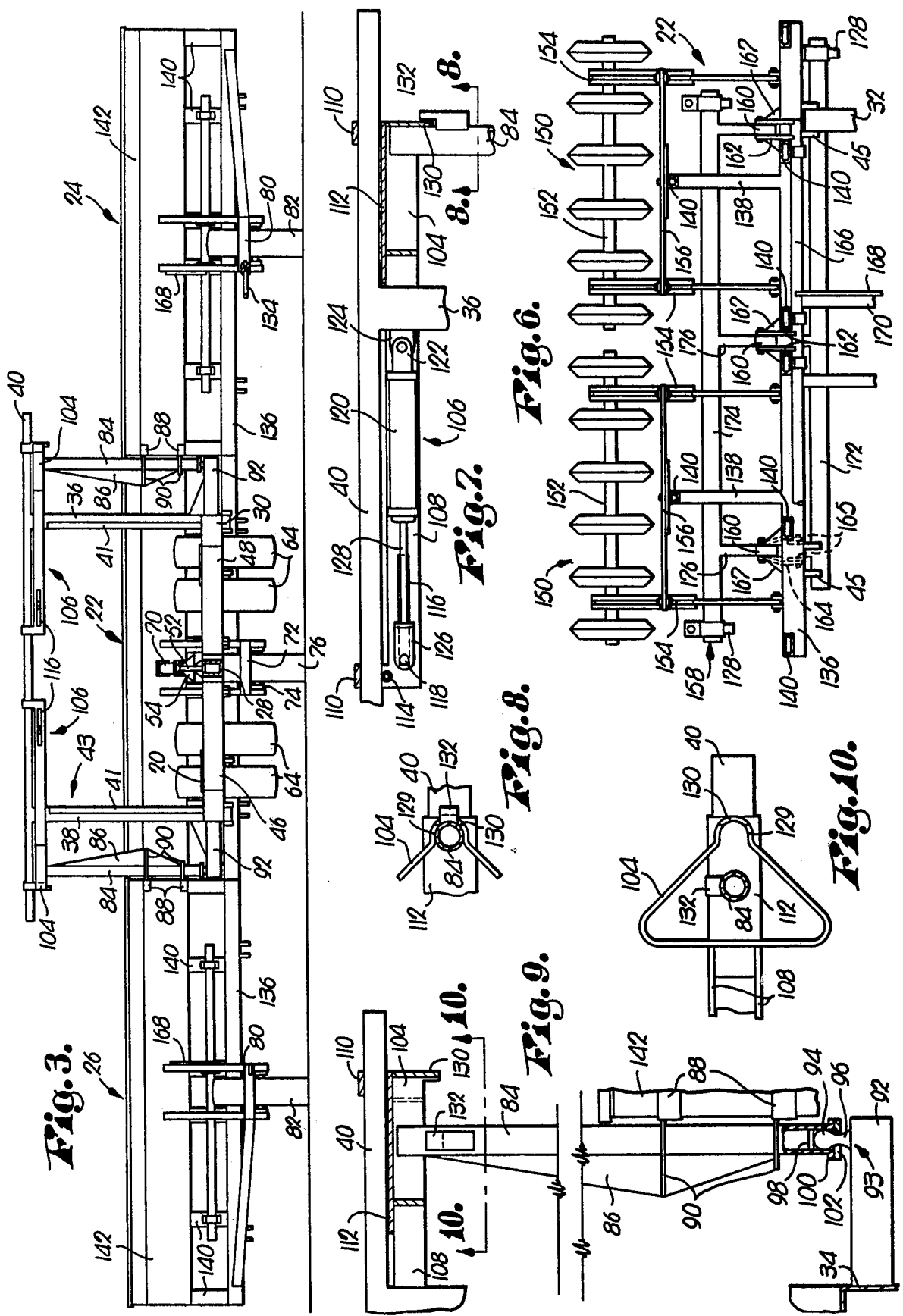

RAISABLE IMPLEMENT FRAME WITH OPERABLY CONNECTED WHEEL AND DRAFT FRAMES

This is a division of application Ser. No. 836,719, filed on Sept. 26, 1977, now U.S. Pat. No. 4,171,022.

BACKGROUND AND BRIEF DESCRIPTION OF THE INVENTION

This invention generally relates to foldable constructions for agricultural implements and deals more particularly with a construction of the type wherein a pair of outrigger implement sections are hingedly connected on respective opposite sides of the center implement section for horizontal swinging movement from a transversely extending ground working position, to a longitudinally extending transport position.

Multiple section, ground conditioning farm implements capable of traversing wide stretches of ground with each sweep but being foldable to permit transport thereof from place to place, have now been in widespread use for several years, and the continuing trend toward large scale farming operations dictates the need for important advancements in foldable construction designs. Several fundamental approaches have been devised in the past to reduce the overall width of wide implement constructions for transport purposes; a number of previous construction designs include a main center section and a transversely extending outrigger section connected to the center section on each side of the latter, the outrigger sections being pivotable either vertically about a longitudinally extending axis at their inner extremity to an essentially longitudinally upright position, or horizontally forwardly or rearwardly to a longitudinally extending position. Although vertically pivotable constructions are attractive due to their simplicity of structure and operation, this design is not practical in connection with especially massive tool sections or dispensing type implements such as grain drills or the like. On the other hand, the horizontal folding approach creates several problems which must be dealt with from a design standpoint. For example, in order to swing the outrigger sections horizontally to their transport position, the ground penetrating tools carried thereby must first be elevated out of engagement with the ground; in the case of relatively lightweight implement sections, the tool carrying frame may be rotated about a transverse axis to pivot the tools out of engagement with the ground as suggested by the implement construction shown in U.S. Pat. No. 3,698,488 to Yoder et al, however where heavier implement sections are employed, vertically shiftable, hydraulic cylinder operated wheels mounted on the outrigger sections are required to elevate the latter as disclosed in U.S. Pat. No. 3,523,699 to Sinkule et al. In any event, prior art constructions having relatively heavy outrigger sections require ground-engaging support wheels connected to the outrigger sections which roll along the ground and carry a substantial portion of the weight of each section, when the latter are shifted between their working and transport positions, and when operating in rough or uneven terrain, it is sometimes difficult to bring the outrigger sections into proper registration with the center frame in order to secure the outrigger sections for transport. Furthermore, difficulty is also often encountered in applying sufficient force to produce smooth swinging movement of the outrigger sections over rough terrain, even with the aid of power means.

According to the present invention, a horizontally foldable implement includes a pair of transversely extending outrigger implement tool sections connected to a drawn center frame by a ball and socket-type hinge that provides a weight bearing, radial pivot for both permitting the outrigger sections to cant, rise and fall in accordance with the terrain as well as to permit the outrigger sections to swing horizontally forward to a longitudinally extending transport position. Structure and mechanism is provided to limit the degree of radial pivotal freedom of the outrigger sections and to selectively restrain the latter from vertical pivotal movement about a longitudinally extending axis whereby to cantilever support the latter on the center section when the center frame is raised by means of vertically shiftable wheel means mounted on the center frame. Each of the implement tool sections is provided with a removably mounted, vertically shiftable tool carrying frame structure, and further includes mechanism to allow selective elevational adjustment of the frame structure whereby to allow changes to be made in the depth of ground penetration by the implement tools.

An important object of invention is to provide a multi-section, folding implement construction having outrigger sections connected to an elevatable center frame by hinge means which provide a weight bearing, radial pivotal mounting of the outrigger sections when the latter are disposed in a lowered, ground conditioning position and for supporting the outrigger sections in a cantilever manner whereby the latter are raised out of contact with the ground when the center frame is elevated, and further permitting horizontal swinging movement of the outrigger sections to allow folding of the latter for transport.

As a corollary to the foregoing object it is a further object of the invention to provide a radial pivotal mounting of the mentioned type employing a ball and socket assembly.

Another object of the invention is to provide a novel implement construction having a main tool carrying frame pivotally connected to a draft frame and provided with pivotally mounted wheel means shiftable into and out of engagement with the ground, for raising and lowering the center frame while maintaining the latter in an essentially horizontal position.

A further object of the invention is to provide novel mechanism and structure for selectively changing the depth of penetration of ground working implement tools mounted on an implement tool carrying section, without the need for vertically shiftable wheel means for changing the elevation of the entire tool carrying section.

A still further object of the invention is to provide an implement tool supporting section with a removably mounted tool carrying frame to allow simple interchange of different types of ground conditioning implement tools.

Other and further objects of the invention will be made clear or become apparent in the course of the following description.

DETAILED DESCRIPTION OF THE INVENTION

In the accompanying drawings:

FIG. 3 is a cross-sectioned, traverse, front view of the folding implement construction in its unfolded, operating position, a draft frame for pulling the implement being broken away in cross section;

Figure 1:
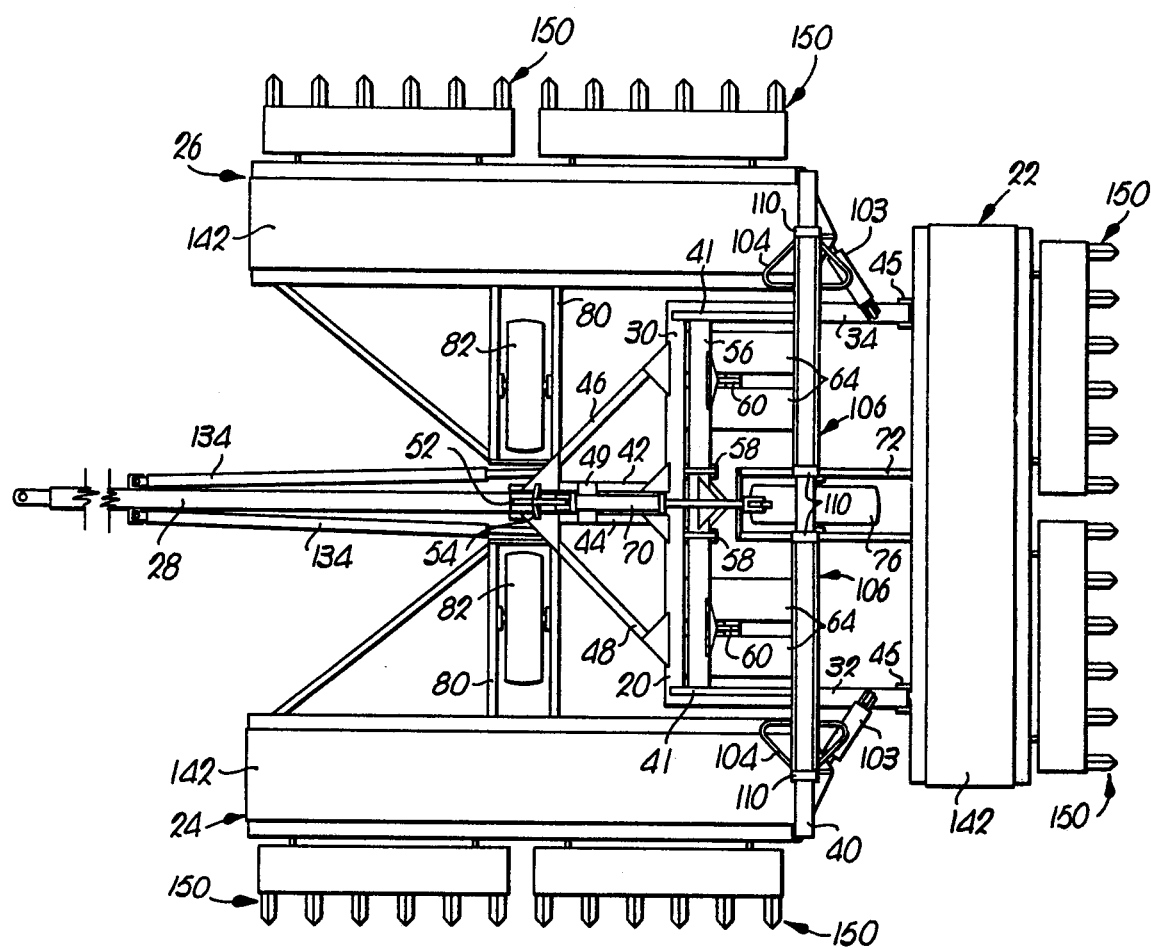
FIG. 1 is a top plan view of a folding implement construction which forms the preferred embodiment of the present invention, showing the implement in its folded, transport position.
Figure 4:
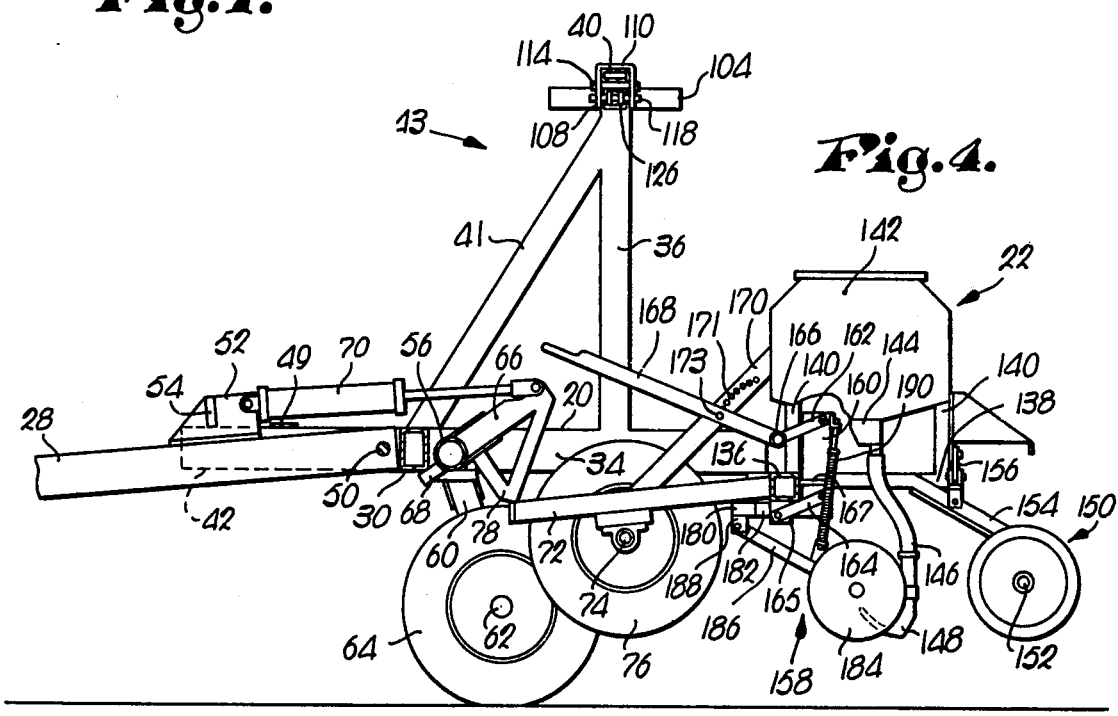
Figure 5:
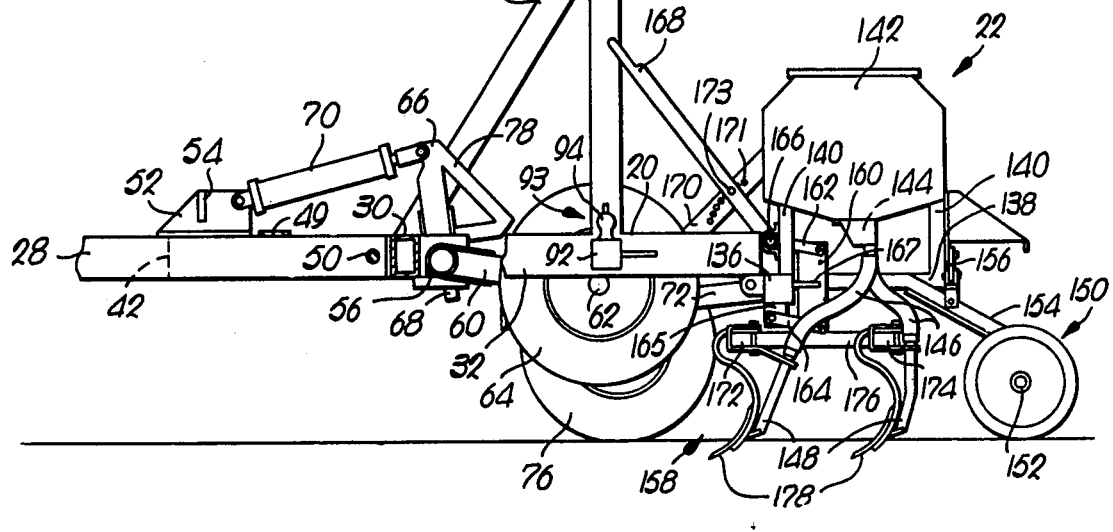

FIG. 4 is a fragmentary, cross-sectioned side view of a rearward portion of the implement construction in its transport position, taken on a larger scale, showing a center tool carrying section having an adjustable disc tool carrying frame removably mounted therewith, an outrigger tool carrying section having been removed and parts of a main center frame being broken away in cross section to more clearly reveal mechanism for controlling wheel means used in transporting the implement;

FIG. 5 is a view similar to FIG. 4 but showing the implement in its transport position, the disc tool carrying frame having been removed and replaced by an adjustable hoe tool carrying frame;

FIG. 6 is a fragmentary, cross-sectioned top view of the center tool carrying section shown in FIG. 5 taken on a larger scale, a seed box storage structure being broken away to show details of the hoe tool carrying frame;

FIG. 7 is a fragmentary, cross-sectioned front view of support structure and reciprocable guide mechanism for controlling the movement of the outrigger tool carrying sections, the guide mechanism being shown in its retracted position and in supporting contact with upper portions of one of the outrigger sections, the latter having been swung to a longitudinally extending position in preparation for transport;

FIG. 8 is a cross-sectioned view taken along the line 8—8 of FIG. 7;

FIG. 9 is a fragmentary, cross-sectioned rear view of structure coupling one of the outrigger sections with the main center frame, parts being broken away in cross section to reveal a ball and socket type hinge mounting and shiftable guide structure for controlling the movement of the outrigger section;

FIG. 10 is a cross-sectional view taken along line 10—10 of FIG. 9; and

Figure 11:

FIG. 11 is a fragmentary, cross-sectioned top view showing motor means coupled between the main center frame of the implement and one of the outrigger sections for shifting the latter between its transversely extending operational position and its longitudinally extending transport position.

Referring initially to FIGS. 1 through 5, a foldable construction for implements, especially adapted for agricultural use, broadly comprises a main center frame 20 having an implement tool carrying center section 22 pivotally connected to the rear thereof and also having foldable implement tool carrying outrigger sections 24 and 26 respectively pivotally connected on opposite sides thereof, there being further provided an elongate draft frame 28 having one extremity thereof pivotally coupled with the center frame 20, the opposite extremity of draft frame 28 being adapted for coupling with a draft vehicle (not shown) such as a tractor or the like.

Center frame 20 is constructed of suitable tubular steel stock of generally rectangular cross section and includes transversely extending front frame member 30 having the opposite extremities thereof respectively joined, as by welding, with the longitudinal side frame members 32 and 34. Upright support members 36 and 38 have their upper ends joined rigidly together by the transversely extending beam 40, while the lower ends thereof are respectively secured to the side frame members 32 and 34, near the midpoints of each of the latter, thus, center frame 20 is made structurally rigid. Bracing members 41, secured between the support members 36 and 38 and front frame member 30, in combination with members 36, and 38 along with beam 40 form superstructure 43 rising above center frame 20. Center frame 20 further includes a pair of forwardly projecting, spaced apart, extension members 42 and 44 secured to front frame member 30, which are respectively disposed adjacent opposite sides of the draft frame 28, each having their respective longitudinal axis generally parallel with the longitudinal axis of the draft frame 28. Brace members 46 and 48 have their opposite ends respectively secured to the forward ends of extension members 42 and 44, and to the front frame member 30. A motion limiting plate 49 extends between the extension members 42 and 44 and is secured to each of the latter in overlaying relationship to the rear extremity of draft frame 28. Draft frame 28 has its rearward extremity connected to center frame 20 by means of the pivot pin 50 for pivotal movement about a transverse, horizontal axis. Mounting member 52 is secured to draft frame 28 and includes stop ears 54 which depend transversely therefrom, on each side thereof, and are disposed in the vertical path of travel of extension members 42 and 44 in order to contact each of the latter when draft frame 20 pivots about pin 50.

Shaft 56 is journalled in frame members 32 and 34 and extends transversely between the latter, shaft 56 being further supported in the central portions thereof by a pair of bearing brackets 58 which are made fast to the frame member 30. A pair of elongate, spaced apart wheel mounting brackets 60 each have one end thereof secured to shaft 56 and depend rearwardly from the latter. Each of the brackets 60 have mounted on the free end thereof, a transversely extending, wheel mounting shaft 62 upon which shaft a ground-engaging wheel 64 is rotatably mounted, on each side of the bracket 60. Shaft 56 also has secured centrally thereon, one end of link arm 66 which is angularly spaced from the bracket 60, there being further provided a stop tab 68 secured to shaft 56 and extending radially from the latter a sufficient length to engage front frame member 30, as shown in FIG. 4. A hydraulically operated, extendable cylinder assembly 70 of the known type has its opposite ends respectively pivotally connected to draft frame 28 through mounting member 52 and the free outer end of the link arm 66. From the foregoing, it is apparent that the wheels 64 are shiftable in a broad arc around the shaft 56 into and out of engagement with the ground as the cylinder device 70 is selectively actuated to apply a rotational torque to shaft 56 by means of link arm 66, the angular displacement of the shaft 56 (and therefore the vertical displacement of wheels 64). It should be further noted at this point that the pivotal movement of center frame 20 with respect to draft frame 28 about pin to is limited in one direction of rotation by virtue of the engagement of stop ears 54 with the extension members 42 and 44, and is limited in the other direction of rotation by the engagement of draft frame 28 by the motion limiting plate 49.

The center tool carrying tool section 22, whose construction is essentially identical to the outrigger sections 24 and 26 and will be discussed in more detail infra, is pivotally attached to the rear of each of the side frame members 32 and 34 by suitable hinge means 45. Generally positioned, wheel support structure 72 comprises a generally rectangular shaped frame bracket secured to the forward side of center section 22, and has mounted thereon, by means of bearing assembly 74, a gage wheel 76 which functions to partially support the center section 22 (when the latter is in its lowered, operating position) and may be employed to drive seed dispensing means associated with the center section 22 through a drive train (not shown). An angularly shaped holding bracket 78 secured to link arm 66 extends longitudinally rearward and is adapted to engage a transversely extending forward portion of the structure 72 (as best seen in FIG. 4) when shaft 56 is rotated, in order to limit the pivotal movement of the center section 22 when the center frame 20 is raised in a manner later described.

Attention will now be turned to a description of the novel manner in which the outrigger sections 24 and 26 are connected to the center frame 20, which forms a significant feature of the invention, and reference is now also made to FIGS. 7 through 11. Outrigger sections 24 and 26 each include a wheel support bracket structure 80 having a gage wheel 82 rotatably mounted thereto for partially supporting the associated outrigger section upon the ground. A vertically extending, tubular post 84 is provided with a triangularly shaped stiffening rib 86, and is secured as by welding, at vertically spaced points adjacent the center frame 20, to rigid framework 88 of the corresponding outrigger section by means of mounting flanges 90. A laterally outward extending extension support 92 is joined to each side of the center frame 20, midpoint of frame members 32 and 34, in transverse vertical alignment with the corresponding longitudinal axes of the tubular posts 84. A hinge member 93 comprises spherically shaped element 94, such as an ordinary ball type hitch member, and a supporting neck 96 which is mounted to the upper horizontal surface of extension support 92 by any suitable means, to provide rigid mounting of the spherical element 94 on each side of the center frame 20. At least the lower extremity of tubular post 84 is generally hollow and includes a circular cross section having a diameter marginally greater than the diameter of the spherical element 94, so that the lower extremity of tubular posts 84 receive the corresponding spherical element 92 therewithin in a slip fit manner. A circular plate 98 is secured as by welding within the open extremity of tubular member 84, spaced a suitable distance from the end of the latter, the longitudinal axis of plate 98 and member 94 being essentially coaxial. The lower end of tubular member 84 terminates in an outturned, generally annular flange 100 which includes a horizontally depending crank arm 101 to which arm there is pivotally attached one end of the extendable cylinder assembly 103, the opposite end of the latter being pivotally secured to the associated frame member 32 or 34 by means of mounting ear 109 which includes an elongate mounting slot 107 therein whose purpose will be described later. A mating flange 102 is removably secured in abutting relationship to the flange 100 by means of bolts 105. Mating flange 102 includes an annular opening therewithin circumscribing the supporting neck 96 and has a diameter marginally less than that of the spherical element 94, thus it can be appreciated that the flanges 100 and 102 provide a releasable retaining means for removably mounting the tubular member 84 on the spherical element 94. It can be further appreciated that a cavity defined in the lower extremity of tubular member 84 by the inner circumferential side walls of the latter in combination with one flat surface of the plate 98, provides socket means to receive spherical element 94 therewithin and to shiftably retain the latter whereby to produce a radial pivoting hinge means.

The longitudinal axis of tubular post 84 extends vertically, perpendicular to the longitudinal axis of the corresponding outrigger section 24 or 26, and is essentially coaxial with the longitudinal axis of the combination of the spherical element 94 and its associated neck 96 when the corresponding outrigger section is disposed in an essentially horizontal position. The upper extremity of tubular post 84 is disposed within a horizontal plane defined by the triangular perimeter of the guide bracket 104 and may engage interior sides of the latter, as well be discussed later. Guide bracket 104 forms a portion of a transversely reciprocable assembly generally indicated by the arrow 106 which is slideably mounted on a transversely extending beam 40.

The reciprocable assembly 106 comprises an elongate connecting arm 108 which includes a pair of hanger brackets 110 secured to the opposite ends thereof. Brackets 110 are of generally U-shaped cross section and slidably receive the beam 40 therethrough, whereby to provide slidable suspension of the arm 108 on beam 40. The guide bracket 104 has inner one leg thereof secured as by welding to the outer end of connecting arm 108 for transverse sliding along with the latter. As best seen in FIG. 7, one end of arm 108 has a horizontal plate 112 secured thereto adjacent the lower surface of beam 40, while the opposite end of arm 108 includes a pin 114 passing longitudinally therethrough, plate 112 and pin 114 functioning to limit the vertical movement of the arm 108 with respect to beam 40 whereby to define a guideway slidable over beam 40. A pair of elongate, lost motion slots 116 are provided in opposite lateral sides of arm 108 and confine the retraction pin 118 therewithin. An extendable assembly 120 has one end thereof pivotally mounted by clevis and pin combination 122 to mounting tab 124 which in turn is secured to the interior side of upright support member 36, the opposite extendable end thereof having a perforated, bifurcated element 126 secured to the extendable output rod 128, pin 118 being secured within the perforations of element 126 and therefore reciprocable within the slot 116 upon operation of the cylinder assembly 120. Guide bracket 104 includes a semicircular receptical area 129 at the lateral most apex thereof for receiving a portion of tubular post 84 complimentarily therewithin, and further includes an arcuate flange element 130 depending downwardly at the mentioned apex. A lock element 132 secured to the upper extremity of tubular post 84 and normally angularly spaced from the flange element 130, includes an upper portion which is spaced from the surface of tubular post 84 to provide an opening within which the flange element 130 may be received when the tubular post 84 is rotated in a clockwise direction as viewed in FIGS. 8 and 10.

As previously mentioned, the outrigger sections 24 and 26 are essentially identical in construction to the center tool carrying section 22, the latter being pivotally connected to, and drawn by, the main center frame 20, the outrigger sections 24 and 26 being pivotally connected to the center frame by means of the previously discussed ball and socket hinge means being drawn by means of the collapsible draft bars 134, each of the latter having their opposite ends respectively pivotally connected to the wheel support bracket structure 80 and the forward extremity of the draft frame 28. Although each of the implement tool carrying sections disclosed in connection with the preferred embodiment of the invention are particularly adapted for seed planting, and are commonly known as "grain drills" in the art, it is understood that virtually any type of ground conditioning implement tool sections may be employed for use with the present invention. Referring now also to FIG. 6, each of the tool carrying sections 22, 24 and 26 includes a transversely extending main support member 136 of a generally rectangular cross section having a pair of longitudinally extending, spaced apart support members 138 secured thereto and extending horizontally rearward therefrom. A plurality of vertically projecting support struts 140 are secured to members 136 and 138, upon which struts there is mounted a transversely extending, seed storage box 142. A seed dispensing mechanism 144 is secured to the bottom of seed storage box 142 and functions to dispense seeds from the latter through the flexible conduit 146, and dispensing nozzle 148 into the ground. Each of the tool carrying sections 22, 24 and 26 is provided with two sets of press wheel tools of the known design, each set being indicated by numeral 150, a plurality of press wheels associated with each set being mounted on a common shaft 152, shaft 152 being mounted for rotation on the longitudinally extending pair of spaced apart, press wheel mounting arms 154 which are secured to main support member 136 and extend rearwardly and downwardly from the latter. A transversely extending support hanger 156 has its midpoint secured to the rearward extremity of one of the longitudinally extending support members 138, the opposite extremities of support hanger 156 being connected to each of the mounting arms 154 to provide additional rigidity for each set of the press wheels. Each of the tool sections 22, 24 and 26 has removably secured thereto, a subframe generally indicated by the arrow 158, which is essentially disposed beneath the main frame comprising main support member 136 and the associated longitudinally extending support members 138. Subframe 158 includes a plurality of vertically projecting mounting members 160 each having the extremity of each of the plurality of vertically spaced apart, upper and lower link arms 162 and 164 pivotally removably attached thereto by releasable retaining means of the known type such as a pin and cotter. The opposite extremity of each of the link arms 164 is pivotally attached to a corresponding mounting tab 165, which tab is secured to support member 136 and depends below the latter. The opposite extremity of each of the link arms 162 is secured to the transversely extending shaft 166 which is mounted for rotation on the strut members 140, the vertical spacing between the opposite extremities of each of the link arms 162 and 164 being such that the mentioned link arms are disposed essentially parallel to each other to form a parallel linkage assembly in combination with the mounting member 160. Longitudinally extending guide flanges 167 are secured to the rear side of support member 136 adjacent each side of a corresponding one of the mounting members 160 and function to restrain the latter from lateral movement. An upwardly and forwardly extending, manually operable lever arm 168 has one extremity thereof secured to the shaft 166, and may be pivoted by operating personnel to rotate the shaft and in turn operate the above mentioned parallel linkage mechanism. A brace member 170 has the opposite extremities thereof secured to the seed box 142 and the wheel support bracket structure 72 or 80 and includes a plurality of perforations 171 transversely therethrough angularly spaced about a radial axis corresponding to the longitudinal axis of shaft 166. Lever arm 168 also includes a perforation 173 therein in registration with the perforations in brace member 170, there being further provided pin means insertable through the perforation in lever arm 166 and one of the perforations in brace member 170 for securing the lever arm 168 to the brace member 170.

The subframe 158 may comprise various structural configurations in accordance with the nature and geometry of the particular implement tools to be carried thereby. As shown in FIGS. 5 and 6, a hoe tool carrying subframe is provided which includes a pair of transversely extending, spaced tool bars 172 and 174 joined together by a plurality of longitudinal connecting elements 176 to form a rigid, generally horizontal structural unit, mounting members 160 being joined to the connecting elements 176. A plurality of hoe tools 178 are secured by any suitable means to each of the tool bars 172 and 174. As shown in FIG. 4, a disc tool carrying subframe is provided which includes a transversely extending tool bar 180 connected to the mounting members 160 by means of longitudinal connecting elements 182. A plurality of disc tool assemblies of the known type include a disc member 182 mounted on one extremity of tool arm 186, the other end of the latter extending upwardly and forwardly and being pivotally secured to the tool bar 180 by means of depending flanges 188. An elongate, strut and spring combination 190 has the opposite extremities thereof secured to mounting member 160 and a middle stretch of the tool arm 186, and functions to bias the disc 184 toward the ground.

Figure 2:
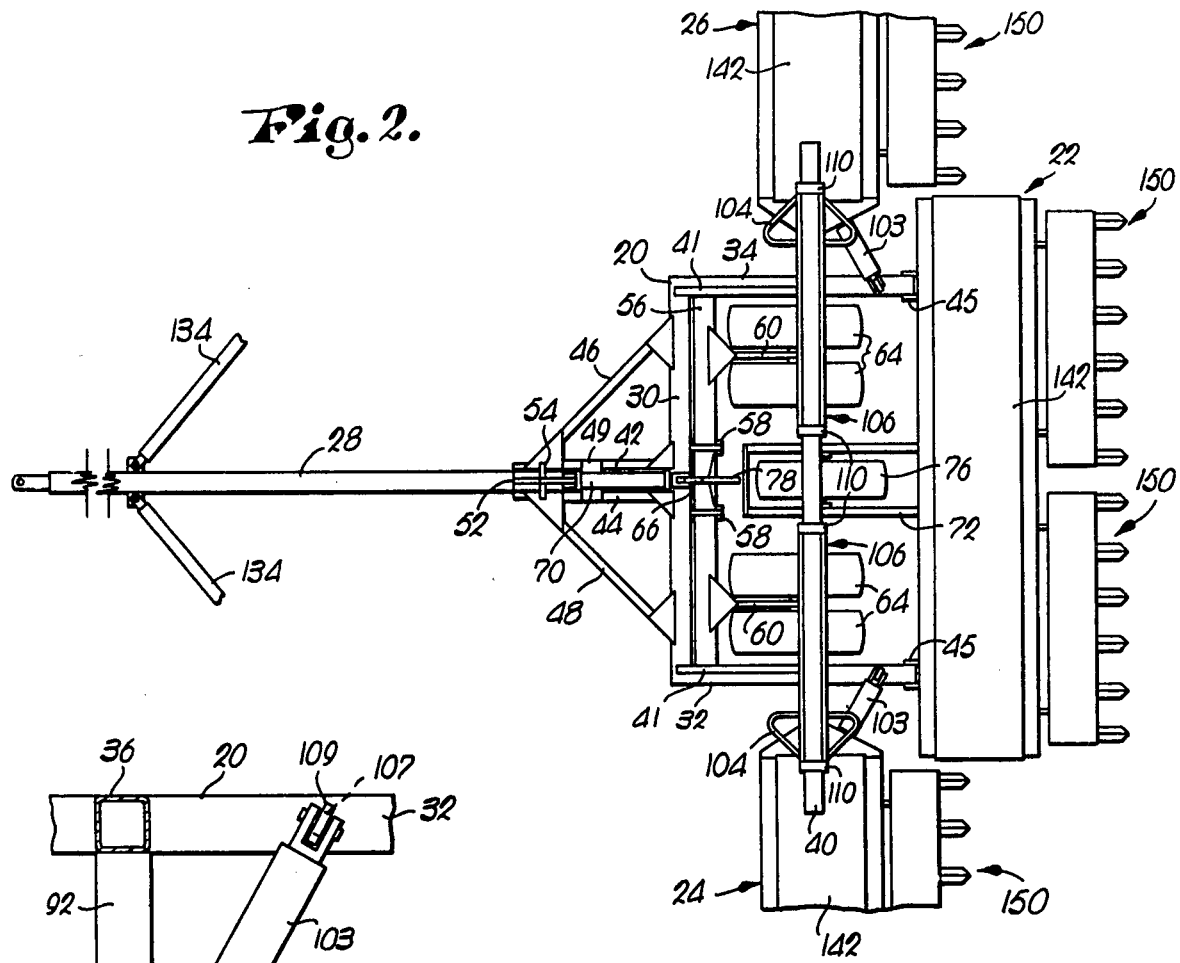
FIG. 2 is a fragmentary, top plan view, similar to FIG. 1, but showing the implement in its unfolded operating position.

The operation of the implement construction will now be described, with particular attention being given to the novel manner in which the outrigger sections 24 and 26 are shifted between the transport and ground working positions. Assume first that the outrigger sections 24 and 26 are in their ground working, transversely extending position as shown in FIGS. 2 and 3; in this position the entire implement is partially supported by the gage wheels 76 and 82, and the transport wheels 64 are in a raised position out of engagement with the ground. As best seen in FIG. 3, the gage wheels 82 are positioned approximately midway between the ends of the associated outrigger section, so that the latter is generally balanced on its corresponding gage wheel, however, it can be appreciated that at least a portion of the weight of the outrigger section 24, 26 will be carried by the spherical element 94, it being further noted that in the event that the invention is used in connection with tool carrying sections which are not provided with any type of ground engaging wheels, the spherical element 94 will carry a substantial portion of the tool section's weight. As the implement is drawn by the draft frame 28 over the ground, the draft bars 134 provide pulling force on the outrigger sections 24 and 26 to maintain the latter in an essentially transversely extending position, essentially parallel with respect to the center tool carrying section 22. Further, when the implement is in its ground working position, cylinder 103 is conditioned to prevent extention thereof so as to form an essentially rigid link between the center frame 20 and the corresponding outrigger section 24 or 26, however, recalling that there is provided a lost motion slot 107 in the mounting ear 109, it is evident that the cylinder 103 will not impede the pivotal motion of the corresponding outrigger section as the latter cants, rises and falls in accordance with uneven terrain, although however, the cylinders 103 will in fact function to limit the forward horizontal swinging movement of the outrigger sections 24 and 26.

From the foregoing, it is apparent that the spherical element 94 provides a singular, pivotal point of connection between the outrigger sections 24 and 26 and the center frame 20. As the implement traverses uneven ground, the extremities of the outrigger sections 24 and 26 are free to rise and fall, thus pivoting on the spherical element 94 about a longitudinally extending axis, while also pivoting about a transversely extending axis, thus each of the outrigger sections 24 or 26 is allowed to pivot with multidegrees of freedom of movement. This multi-directional pivotal movement is transmitted by tubular post 84 and is translated by the upper extremity of the latter to an essentially two dimensional area within the perimeter of guide bracket 104. With the cylinder members 120 in a retracted condition with pin 118 moved lateral outward within the slot 116, the arms 108 are freely slidable on member 40 and therefore are shiftable in either transverse direction when the end of tubular member 84 engages the lateral wall portions of the guide bracket 104 and urges the latter in a lateral direction due to the raising or lowering of the outer extremities of the outrigger sections 24 and 26. The guide bracket 104 being restrained from movement in a longitudinal fore and aft direction, it can be appreciated that the pivotal movement of the outrigger sections 24 and 26 about a transversely extending axis is limited to a discrete angular displacement by virtue of the fact that the upper end of tubular member 94 engages, and is restrained by the outer adjacent legs of guide bracket 104.

In folding the implement for transport, the following sequence of events takes place. The cylinder assemblies 120 are first actuated to their extended position causing the pin 118 to slide laterally inwardly within slot 116 whereby to engage the arm 108. Upon continued travel of the pin 118, arm 108 along with guide bracket 104 are also shifted laterally inward. As the guide bracket 104 shifts inwardly, the end of tubular member engages the outer adjacent legs thereof, and is guided by the same into a central position and eventually into the semi-circular receptacle area 129. With the end of tubular member 84 seated within the receptacle area 129, the cylinder 120 continues to shift the bracket 104 inwardly until the associated outrigger section is pivoted to an essentially horizontal position. At this point, it can be appreciated that the outrigger sections 24 and 26 are prevented from pivotal movement about a transverse axis by virtue of the fact that the end of tubular member 84 is essentially locked into position within the receptacle area 129, and is therefore prevented from fore and aft, longitudinal movement. With the outrigger sections 24 and 26 locked into position and prevented from pivotal movement about a longitudinally extending axis by guide bracket 104, cylinder assembly 70 is then actuated from a retracted condition to an extended condition for causing the center frame 20 to be elevated in the following manner: as the cylinder assembly 70 is extended, link arm 66 is pivoted rearwardly causing shaft 56 to rotate in a clockwise direction as viewed in FIGS. 4 and 5, in turn causing wheel mounting brackets 60 and their associated wheels 64 to pivot downwardly into engagement with the ground; continued extension of cylinder assembly 70 causes the center frame 20 to then elevate from its lowered horizontal ground working position depicted in FIG. 5 to its elevated, horizontal transport position shown in FIG. 4. The center frame 20 is maintained in a horizontal position during the elevation thereof by virtue of the fact that draft frame 28 pivots with respect to center frame 20 about pivot pin 50. As the center frame 20 is elevated and the ground conditioning tool associated with each of the tool carrying sections 22, 24 and 26 are raised out of engagement with the ground, along with their associated gage wheels 76 and 82, the brace members 48 engage stop ears 54 to limit the pivotal movement of draft frame 28 with respect to center frame 20, and the holding bracket engages the wheel support bracket structure 72 in order to lock the center tool carrying section 22 into a position for transport whereby the latter is prevented from pivotal movement in a clockwise direction as viewed in FIGS. 4 and 5. From the foregoing, it can be appreciated that the outrigger sections 24 and 26 are also raised out of engagement with the ground when the center frame 20 is elevated to its transport position due to the cantilever mounting of the outrigger sections 24 and 26 provided by the spherical element 94 and the guide bracket 104. With each of the tool carrying sections now elevated out of contact with the ground and disposed in an essentially horizontal position, the outrigger sections 24 and 26 are then ready for folding into a transport position. The outrigger sections 24 and 26 are folded into a transport position upon actuation of the cylinder assemblies 103 which extend to cause the outrigger sections to swing forwardly horizontal until the longitudinal axis of each of the outrigger sections extend essentially parallel to the forward direction of travel of the implement. As the outrigger sections 24 and 26 are swung horizontally forward the tubular posts 84 pivot about their longitudinal axes and are restrained in an essentially vertical position by the spherical element 94 and receptacle area 129. As the tubular posts 94 are pivoted, the lock element 132 likewise pivots and cooperatively engages the flange element 130, thereby securing the end of the tubular member 84 within the receptacle area 129 which assures that the corresponding outrigger section is prevented from pivotal movement when the latter is in its longitudinally extending transport position. In order to unfold the implement for use, the above discussed procedure for folding the implement is simply reversed.

Attention is now directed to the manner in which the elevation of the implement tools may be selectively varied with respect to the ground by virtue of the vertically shiftable, removably mounted tool carrying subframe 158. Upon removal of the previously mentioned pin from the perforation 173 in lever arm 168, the latter is free to pivot along with shaft 166. Upon pivoting of lever arm 168 and shaft 166 upper link arm 162 likewise pivots and in turn changes the elevation of mounting member 160, the lower link arm 164 functioning to maintain the shifting movement of mounting member 160 in an essentially vertical direction so that the subframe remains essentially horizontal with respect to the ground when the latter is raised or lowered in accordance with the operation of the lever arm 168. Inasmuch as the entire subframe 158 is connected to the corresponding tool carrying section solely by means of the simple releasable retaining means pivotally fastening the link arms 162 and 164 to the corresponding mounting members 160, it can be appreciated that a subframe carrying one kind of implement tool may be removed from the corresponding tool section simply by removing the mentioned releasable retaining means, and another subframe carrying a different type of implement tool may then be mounted on the same tool section. Thus it can be appreciated that the invention provides novel structure and mechanism for removably mounting an implement tool carrying subframe on a main frame associated with a drawn implement carrier.

From the foregoing it is clear that the invention provides a novel means for folding a multi-section agricultural implement. Thus, it will be observed that my improved construction not only provides for the reliable accomplishment of the objects of the invention, but does so in a particularly simple and economical manner. It is recognized, of course, that those skilled in the art may make various modifications or additions to the embodiment chosen to illustrate the invention without departing from the gist and essence of my contribution to the art. Accordingly, it is to be understood that the protection sought and to be afforded hereby should be deemed to extend to the subject matter claimed and all equivalents thereof fairly within the scope of the invention.

Having thus described the invention, what is claimed as new and desired to be secured by Letters Patents is:

1. An implement carrier shiftable between a ground conditioning position and a transport position including:
    a longitudinally extending, vertically swingable draft frame having the forward extremity thereof adapted to be drawn by a draft vehicle;
    an implement supporting frame pivotally connected to said draft frame for movement about a transverse axis between a lowered, generally horizontal ground conditioning position and a raised, generally horizontal transport position;
    wheel means;
    wheel frame means for rotatably carrying said wheel means on said supporting frame,
    said wheel frame means including a transversely extending, essentially horizontal support shaft journalled for rotation in said supporting frame;
    linkage means for shiftably mounting said wheel means on said supporting frame for movement of said wheel means into supporting engagement with the ground when the carrier is in its transport position and out of engagement with the ground when the carrier is in its ground conditioning position,
    said wheel frame means being pivotally mounted on said supporting frame and connected to said linkage means for control by the latter;
    an extendable motor assembly operably connected between said draft frame and said linkage means,
    said motor assembly being selectively actuatable for operating said linkage means to move said wheel means into engagement with the ground and to raise said supporting frame into its transport position, and to move said wheel means out of contact with the ground whereby to allow said supporting frame to descend to its said ground conditioning position,
    said linkage means including a link element connected to said shaft and to one extremity of said motor assembly, the other extremity of the latter being connected to said draft frame,
    said motor assembly functioning to rotate said shaft by shifting said link element, whereby to cause said wheel means to move into and out of engagement with the ground,
    there being a stop element secured to said shaft and rotatable along with the latter for engaging said supporting frame whereby to limit the rotation of said shaft;
    an implement tool section pivotally mounted on the rear of said supporting frame and spaced behind said wheel means; and
    structure secured to said shaft and rotatable along with the latter for engaging a portion of said tool section when said shaft is rotated during shifting of said carrier from its ground conditioning position to its transport position.

2. The invention of claim 1, wherein the longitudinal axis of said shaft is spaced behind said transverse axis associated with said pivotal connection between said supporting frame and said draft frame.

3. The invention of claim 1, wherein said supporting frame comprises:
    a transversely extending front frame member, and
    a pair of parallel, longitudinally extending spaced apart side frame members joined to the extremities of said front frame member,
    said shaft being journalled in said side frame members and extending between each of the latter essentially parallel to said front frame member,
    said wheel means being generally disposed between said side frame members,
    said portion of said supporting frame being secured to said front frame member and extending perpendicularly forward from the latter and vertically parallel to said draft frame.

* * * * *